United States Patent Office 3,115,484
Patented Dec. 24, 1963

3,115,484
COAGULATION OF AQUEOUS POLYMER
EMULSION
Gottfried Scriba, Leverkusen, and Anton Robert Heinz,
Cologne-Flittard, Germany, assignors to Farbenfabriken Bayer Aktiengesellschaft, Leverkusen, Germany, a corporation of Germany
No Drawing. Filed Mar. 29, 1960, Ser. No. 18,253
Claims priority, application Germany Apr. 7, 1959
8 Claims. (Cl. 260—83.3)

The present invention relates to the coagulation of polymers of olefinic monomers, and more especially of polymers of conjugated diolefins of low molecular weight produced in aqueous emulsion.

It is known from German Patent No. 878,864 to work up aqueous emulsions of polymers of olefinic monomers by coagulating these emulsions at temperatures above the liquifying point of the polymerizates and after removal of the aqueous phase, washing with water. For producing these polymerizates acid-insensitive emulsifying agents were applied, such as alkylated naphthalene sulphonic acids or paraffin sulphonic acids, whereas the coagulation of the emulsion polymerizates was performed with the aid of neutral alkaline earth salts or aluminium salts. It is necessary, however, in this case to submit the coagulated polymerizates to a prolonged washing process to remove the coagulation agent and the emulsifier.

It has now been found that the washing stage can be dispensed with if emulsifiers are used for the production of the aforesaid emulsion polymerizates which have no emulsifying action in the acid pH range, the polymerization being carried through in an alkaline aqueous emulsion and the coagulation of the emulsions being brought about with the aid of ammonium salts which lower the pH value of the emulsions at elevated temperatures far enough for the aforesaid emulsifiers to lose their emulsifying activity.

Suitable emulsifiers for the carrying out of this process are, for example, unsaturated higher fatty acids, liquid at room temperature and miscible with the emulsion polymerizates, such as oleic acid, linoleic acid and liquid mixtures of fatty acids having preferably 10 to 18 carbon atoms, as for instance those present in the coconut fatty acid. These emulsifiers are used in the form of their water soluble salts, preferably their alkali metal salts in general in quantities of 2 to 10 percent by weight calculated on the weight of the monomers. As ammonium salts for effecting the coagulation of the emulsion there come into consideration especially ammonium salts of non-volatile inorganic acids, preferably polybasic acids, such as ammonium sulphate or ammonium phosphate. These salts which are preferably applied in the form of 2 to 10 percent aqueous solutions should not lower the pH value of the emulsions substantially after being added to the polymerization emulsion and thus not lead to any coagulation of the polymerizate at normal temperatures. Only if the emulsions are brought to temperatures of about 60 to 100° C., preferably 80 to 95° C., does coagulation set in. The ammonium salts are applied preferably in amounts of about 3 to 50 g., especially 5 to 10 g., per 100 g. of polymerizate (the polymerizate being applied in the form of aqueous emulsions containing, preferably 25 to 50%, especially 30 to 40% by weight of the polymer). The process is suitable especially for the coagulation of polymerizates and mixed polymerizates of conjugated diolefins with 4 to 7 carbon atoms such as butadiene, isoprene, 2-chlorobutadiene, 3-cyanobutadiene 1-3 and dimethylbutadiene. As polymerization components for the production of mixed polymerizates, there come into consideration in a manner known as such, mono-olefinically unsaturated monomers, especially monovinyl aromatic monomers, such as styrene, vinyl toluene, acrylonitrile, esters of acrylic acid and methacrylic acid and saturated monovalent aliphatic and cycloaliphatic alcohols, with 1 to 10 carbon atoms, said monoethylenically unsaturated monomers being preferably applied in smaller amounts than the conjugated diolefins, preferably in amounts not surpassing 40 percent by weight as calculated on the weight of the total monomers.

The polymerization of these monomers is carried out in the presence of suitable molecular weight regulators, for example higher alkyl mercaptans in which the alkyl group contains 10 to 20 carbon atoms or dialkyl xanthogen disulphides in which the alkyl groups contain 2 to 10 carbon atoms, preferably 3 to 4 carbon atoms, these regulators preferably being used in quantities of about 3 to 10, preferably 5 to 8 percent by weight, as calculated on the monomers, so that the polymerizate obtained possesses a K-value of about 10 to 50, preferably 25 to 40. (As to the definition of the term "K-value" reference is made to "Cellulose-chemie" 13 (1932), p. 60.) The pH value of the polymerization medium is adjusted to 7.5 to 13, preferably 8 to 10.

After the polymerization the latex is freed from the remaining monomer in a known manner and then mixed with an aqueous solution of a suitable ammonium salt so that no coagulation yet occurs. This mixture is then heated, whereupon the pH value falls to such an extent that the emulsifying action of the emulsifying agent is removed and the polymerizate separates as a clear honey-yellow layer in the upper part of the material. The lower aqueous layer can then be separated without difficulty from the upper layer and finally the still hot liquid polymerizate can be removed from the reaction zone. The emulsifying agents remaining in the polymerizate do not have any bad influence on the vulcanization properties of the polymerizate.

In the following examples the parts referred to are by weight.

*Example 1*

5 parts of oleic acid are dissolved in 150 parts of water with the addition of somewhat more than the stoichiometrically required quantity of caustic soda, dissolved in 150 parts of water, with addition of 1 part of tetrasodiumphosphate. In this emulsifier solution the following are emulsified: 35 parts of acrylonitrile and 65 parts of butadiene in which 4 parts of diisopropyl xanthogen disulphide are dissolved. The polymerization is conducted at 40° C. by adding small quantities of triethanolamine and potassium persulphate. At a conversion of 15, 30 and 50 percent, one part each time of diisopropyl xanthogen disulphide was further added and the polymerization stopped finally at a conversion of 80 percent by the addition of 0.1 part of sodium dimethyl dithiocarbamate. As an antiageing agent 1.5 parts of 2,2'-dihydroxy-3,3'-dicyclohexyl-5,5' - dimethyl diphenyl-methane was added to the latex in the form of an emulsion and the residual monomers were removed in vacuum by heating. The latex is stirred at room temperature with equal parts of a 5 percent aqueous solution of diammonium phosphate and this mixture is then heated to 85 to 90° C. After 5 hours' standing at this temperature the polymerizate separates as a clear honey-yellow upper layer; the likewise clear aqueous lower layer is withdrawn and the polymerizate stirred for a further 3 hours at 80° C. in vacuum. The last traces of water are thereby removed. The polymerizate can then be taken off through a rising pipe or through an outlet. It has a K-value of 34.5.

*Example 2*

In a similar manner to that described in Example 1 a low molecular weight viscous polymerizate can be produced if 70 parts of butadiene and 30 parts of styrene are polymerized in the manner described above with the use of 5 parts of tertiary dodecyl mercaptan as regulator and 5 parts of coconut fatty acid as emulsifier. The polymerization is stopped at 60 percent conversion, stabilized in the same way as above and freed from monomer. The working up can also be carried out as in Example 1 with a difference that ammonium sulphate is used for the separation instead of phosphate. One finally obtains a viscous polymerizate with a K-value of 28.

*Example 3*

100 parts of monomeric chloroprene stabilized with 0.2 part of phenothiazine are added together with 7 parts of n-dodecyl mercaptan to a solution of 5 parts of oleic acid and 1–5 parts of caustic soda in 140 parts of water. The emulsion which is formed by stirring is polymerized under nitrogen at a temperature of 40° C. by adding 0.25 part of formamidine sulphinic acid. The yield of polychloroprene reaches 80 percent after about 6 hours whereupon the residual chloroprene is removed in vacuum at slightly elevated temperature.

This polychloroprene latex is mixed with an equal volume of 5 percent diammonium phosphate solution at room temperature. Coagulation occurs during 4 hours' standing at about 95° C., the specifically heavy liquid chloroprene polymerizate precipitates and is removed from the aqueous portion. The yield is practically quantitative.

*Example 4*

100 parts of unstabilized chloroprene are emulsified in the presence of 5 parts of n-dodecyl mercaptan with a solution of 4.5 parts of oleic acid and 1.6 parts of caustic potash in 140 parts of water and polymerized at 15° C. with the aid of 0.2 part of potassium persulfate as activator. After about 8 hours the yield of liquid polymerizate amounts to approximately 75 percent, whereupon the polymerization is stopped with 0.1 part of phenothiazine. The remaining monomers are withdrawn finally as in Example 1.

This latex is heated after mixing with an equal volume of 5 percent aqueous diammonium phosphate solution with stirring, to 100° C. and allowed to stand without stirring at this temperature for 5 hours. The polymer material separates quantitatively as a readily washable lower phase.

We claim:

1. A process of producing and coagulating aqueous emulsions of polymers of conjugated dienes which comprises polymerizing the monomers in an alkaline aqueous medium in the presence of a fatty acid emulsifier of at least 10 carbon atoms, which loses its emulsifying property upon transfer into the acid pH range, coagulating the polymer emulsion thus obtained by mixing the emulsion with an ammonium salt of an acid which is non-volatile at temperatures of about 60°–100° C., and heating the emulsion to about 60–100° C. to coagulate said emulsion, whereafter the coagulate formed is separated from the aqueous medium.

2. A process of producing and coagulating aqueous emulsions of polymers selected from the group consisting of homopolymers of aliphatic conjugated diolefins having 4 to 7 carbon atoms and copolymers of said diolefins with monoethylenically unsaturated monomers, which comprises polymerizing the monomers in an alkaline aqueous medium in the presence of a fatty acid emulsifier having at least 10 carbon atoms and having the property of losing its emulsifying action under acid conditions, and coagulating the resulting polymer emulsion by adding to the latter an ammonium salt of an acid which is non-volatile at temperatures of about 60°–100° C., and then heating the emulsion to a temperature of 60–100° C., whereafter the coagulate thus formed is separated from the aqueous phase.

3. The process of claim 2 wherein said polymers have a K-value of 10–50.

4. The process of claim 2 wherein said copolymers are prepared by the polymerization of conjugated diolefins of 4–7 carbon atoms with not more than 40% by weight of monoethylenically unsaturated monomers.

5. The process of claim 2 wherein said polymers are homopolymers of chloroprene.

6. The process of claim 2 wherein said polymers are copolymers of butadiene and a compound selected from the group consisting of acrylonitrile and styrene.

7. The process of claim 2 wherein said fatty acid emulsifier is employed in the form of a water-soluble salt.

8. A process of producing and coagulating aqueous emulsions of polymers selected from the group consisting of homopolymers of aliphatic conjugated diolefins having 4 to 7 carbon atoms and copolymers of said diolefins with monoethylenically unsaturated monomers, which comprises polymerizing the monomers in an alkaline aqueous medium in the presence of a fatty acid emulsifier having at least 10 carbon atoms and having the property of losing its emulsifying action under acid conditions, and coagulating the resulting polymer emulsion by adding diammonium phosphate thereto in an amount sufficient to cause coagulation of the latex when the latter is subsequently heated to 60°–100° C., and then heating the latex to that temperature for a time sufficient to cause separation of the coagulated latex from the aqueous phase.

References Cited in the file of this patent

UNITED STATES PATENTS

| 2,469,827 | Johnson | May 10, 1949 |
| 2,538,273 | Rhines | Jan. 16, 1951 |
| 2,963,459 | Nicholson et al. | Dec. 6, 1960 |